June 25, 1940.  C. COLLINS  2,205,811

LIQUID CONTROLLED DEVICE

Filed April 12, 1939

WITNESS
H. Woodard

Inventor
Calhoun Collins

By
H. B. Willson &co
Attorneys

Patented June 25, 1940

2,205,811

UNITED STATES PATENT OFFICE 2,205,811

LIQUID CONTROLLED DEVICE

Calhoun Collins, Bakersfield, Calif., assignor of two-fifths to California Pacific Service, Inc., Bakersfield, Calif., a corporation of California, and one-fifth to Theodore M. Ryerson, Bakersfield, Calif.

Application April 12, 1939, Serial No. 267,528

6 Claims. (Cl. 137—111)

The invention aims to provide a simple, inexpensive and efficient device for use with various kinds of liquid handling machines or apparatus, to automatically perform an operation, such as giving an audible or visible signal or stopping the machine or apparatus, when a predetermined condition exists.

One of the principal uses of the invention is in connection with the well known extractor used in laundries and the like, and when the invention is so used, the extractor may be stopped at the proper time to leave the required moisture but no more in the load upon which said extractor is operating, insuring the best and most economical results when finishing.

Another practical application of the invention is in connection with various kinds of tanks from which liquid is discharged, to perform a predetermined operation when the discharge of liquid has dwindled to a predetermined extent.

With the foregoing in view, the invention resides in the novel subject matter hereinafter described and claimed, description being accomplished by reference to the accompanying drawing.

Figure 1:
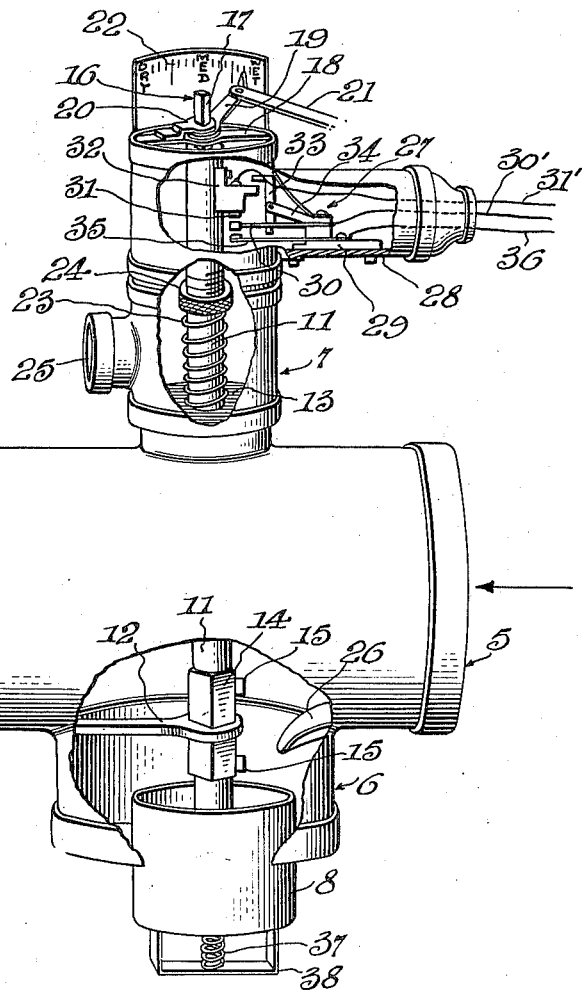
Fig. 1 is a sectional perspective view showing a preferred form of construction.
Figure 2:
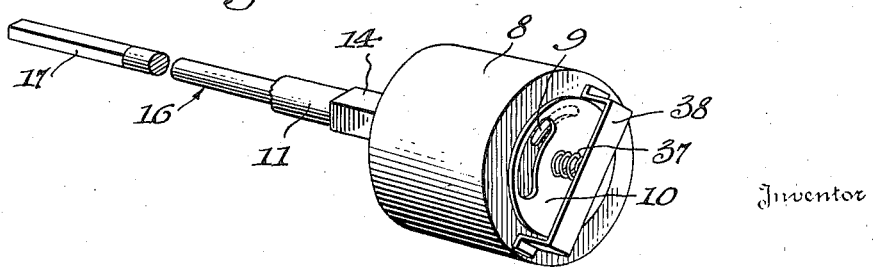
Fig. 2 is a detail perspective view showing the liquid-receiving cup, the valve for adjusting the drain opening of said cup, and the shafts which carry the cup and adjust the valve.

While the form of construction herein disclosed will be rather specifically described, it is to be understood that variations may be made within the scope of the invention as claimed.

A casing 5 is shown for horizontally conducting a liquid, said casing having a relatively short downward extension 6 and a comparatively long upward extension 7. Totally or partially within the downward extension 6, is a cup 8 to continuously receive some of the liquid flowing through the casing, the bottom of said cup being provided with a drain opening 9 through which some of its contents discharges continuously. Normally, however, the cup 8 is kept full of the liquid and is held in a lowered position by the weight of said liquid, but when the liquid flow through the casing dwindles sufficiently, the cup contents will drain from the cup, whereupon the latter is moved upwardly to perform the desired operation.

A disk valve 10 contacts with the bottom of the cup 8 to control the effective size of the drain opening 9 and to thus control the time at which the cup may move to its raised position, and provision is made for adjusting said valve 10 at will.

A tubular vertical shaft 11 is secured to the cup bottom and extends upwardly therefrom, said shaft 11 being slidably but non-rotatably mounted in suitable guides 12 and 13, the former being mounted within the upper portion of the downward extension 6 of the casing 5, and the guide 13 extending across the lower portion of the extension 7. I have shown the shaft 11 as provided with a flat-sided external portion 14 engaging the guide 12 which is similarly shaped internally, to hold said shaft against rotation. Stops 15 have been shown on the portion 14 above and below the guide 12 to limit the vertical movements of the shaft.

An adjusting shaft 16 is provided for the valve disk 10, said adjusting shaft extending through the tubular shaft 11 and being secured at its lower end to said valve disk. The upper end of the shaft 16 passes through a guide or bearing 18 carried by the upper end of the casing extension 7 and is provided with a flat-sided portion 17 above said member 18. This flat-sided shaft portion 17 passes slidably through an adjusting arm 19 which lies upon the member 18 and is held against ascent by an overlying arm 20. By swinging the arm 19, the shaft 16 may be turned to adjust the disk valve 10 as desired, thereby controlling the effective size of the drain opening 9 in the cup 8. A link 21 is shown connected with the arm 19 for adjusting said arm from a remote point.

In the present disclosure, the arm 19 is cooperable with an indicating scale 22 to aid in swinging said arm to the desired adjusted position and it will be obvious that said scale may be calibrated in any desired way suitable to the apparatus or machine with which the invention is to be used. The scale used is illustrative of those which may be used when the invention is to be employed in connection with an extractor.

A coiled spring 23 surrounds the shaft 11 to move the two shafts 11 and 16 and the cup 8 upwardly when said cup has been drained sufficiently to permit said spring to act. In the present disclosure, the spring 23 bears against the guide 13 at its lower end and against an adjusting nut 24 at its upper end, said nut 24 being threaded on the shaft 11 and being accessible for adjustment through a suitable opening 25 in the casing extension 7. By adjusting the nut 24, the device may be set so that the cup 8 will move downwardly under the weight of any desired amount of liquid.

As long as liquid is flowing through the casing 5 at a greater rate than it discharges through the drain opening 9 of the cup 8, said cup will remain in lowered position but as soon as the flow of liquid through the casing dwindles sufficiently to allow the predetermined draining of the cup, the spring 23 lifts said cup and the shafts 11 and 16. This movement may be relied upon simply to give an audible or visible alarm or to otherwise perform work, for instance, stopping an extractor when the invention is used in connection therewith. With the construction shown, it is advisable to provide the bottom of the casing 5 with a spout 26 overhanging the cup 8 to direct liquid into the latter even when the flow through the casing is very slight.

For illustrative purposes, I have illustrated an electrical switch 27 controlled by the vertical movements of the cup 8 and shaft 11, said switch forming part of an electrical system for automatically stopping an extractor when it has extracted the required amount of water, but no more than the required amount, from the load being handled, said switch also serving to condition the circuit for the next operation of the extractor upon closing of the usual control switch (not shown).

The switch 27 is preferably mounted in a suitable enclosure 28 projecting laterally from the casing extension 7, and said switch may well be constructed as described below.

An insulating base 29 is secured in the casing 28 and carries an upwardly biased contact arm 30. Over this contact arm is a contact 31 on an insulating block 32 secured to the shaft 11. As long as the cup 8 and shaft 11 are lowered, the contacts 31 and 30 are in engagement with each other and current then flows through the wires 30' and 31' to effect machine operation. However, when contact 31 is lifted from engagement with contact 30, the machine circuit is broken.

A latch 33 is provided to hold the contact arm 30 in the position to which it is downwardly sprung by the descent of the block 32, said latch being pivoted to a bracket 34 secured to the base 29. When the block 32 is lifted to separate contact 31 from contact 30, to stop the machine, continued upward movement of said block releases the latch 33, whereupon the upwardly biased contact arm 30 snaps upwardly again into engagement with contact 31. The circuit may thus be conditioned for restarting of the machine by closing the usual hand control switch (not shown).

Another contact arm 35 and wire 36 connected therewith, are shown, said contact arm 35 being cooperable with the arm 30 when the latter is lowered, to effect illumination of a light (not shown). The light circuit is, of course, broken whenever contact arm 30 swings upwardly upon release of the latch 33.

From the foregoing taken in connection with the accompanying drawing, it will be seen that novel and advantageous provision has been made for carrying out the object of the invention, but attention is again invited to the possibility of making variations within the scope of the invention as claimed.

A spring 37 is shown for holding the disk valve 10 against the cup bottom but other suitable provision could be made for this purpose. When the spring is employed, a yoke 38 may be secured to the cup to support said spring.

I claim:

1. A device of the class described comprising a liquid conducting casing, a cup in said casing positioned to continuously receive some of the liquid flowing therethrough, means mounting said cup for downward movement under the weight of the liquid, means for moving said cup upwardly when relieved of said weight, said cup having a drain opening of insufficient conducting capacity to drain said cup until the flow of liquid through said casing and into said cup dwindles to a predetermined extent, a valve for controlling the effective size of said drain opening, and means operatively connected with said valve and extending to the exterior of said casing for adjusting said valve.

2. A device of the class described comprising a liquid passage, a cup positioned to receive some of the liquid from said passage, said cup having a drain opening which drains said cup when the supply of liquid thereto diminishes to a predetermined extent, two vertical telescoped shafts extending upwardly from said cup, one of said shafts being secured to said cup, an adjusting valve for said drain opening connected with the other of said shafts and adjustable by means thereof, guide means slidably engaged with the outermost of said shafts to mount said cup for descent under the weight of the liquid therein, and means for lifting said shafts and cup when the latter has drained to a predetermined extent.

3. A device of the class described comprising a liquid passage, a cup positioned to receive some of the liquid from said passage, said cup having a drain opening which drains said cup when the supply of liquid thereto diminishes to a predetermined extent, a vertical tubular shaft secured at its lower end to said cup, an adjusting valve for said drain opening, an adjusting shaft for said valve extending upwardly through said tubular shaft, guide means slidably engaged with said tubular shaft to mount said cup for descent under the weight of the liquid therein, and means for lifting said shafts and cup when the latter has drained to a predetermined extent.

4. A device of the class described comprising a liquid passage, a cup positioned to receive some of the liquid from said passage, the bottom of said cup having a drain opening which drains said cup when the supply of liquid thereto diminishes sufficiently, a valve disk lying against the lower side of the cup bottom for controlling said drain opening, a rotatable adjusting shaft secured at its lower end to said valve disk and extending upwardly through the cup bottom, a tubular shaft surrounding the aforesaid adjusting shaft and secured at its lower end to said cup bottom, guide means slidably engaged with said tubular shaft to mount said cup for descent under the weight of the liquid therein, and means for lifting said cup and shafts when the former has drained to a predetermined extent.

5. A device of the class described comprising a liquid conducting casing having a relatively short downward extension and a relatively long upward extension, a cup in said downward extension to receive some of the liquid flowing through the casing, said cup having a drain opening which drains said cup when the supply of liquid thereto diminishes to a predetermined extent, a tubular shaft carrying said cup and extending upwardly therefrom in said upward extension, fixed guides in said casing with which said tubular shaft is slidably engaged to mount said cup for descent under the weight of the liquid therein, a spring in said casing for raising said shaft and said cup when the latter has been drained sufficiently, and adjusting valve for said drain opening, and an adjusting shaft for adjusting said valve, said adjusting shaft extending upwardly through and beyond said tubular shaft.

6. A device of the class described comprising a liquid passage, a cup positioned to receive some of the liquid from said passage, said cup having a drain opening which drains said cup when the supply of liquid thereto diminishes to a predetermined extent, two vertical shafts extending upwardly from said cup, one of said shafts being secured to said cup, an adjusting valve for said drain opening, said valve being operatively connected with the other of said shafts to be adjusted by means thereof, guide means slidably engaged with said one of said shafts to mount said cup for descent under the weight of the liquid therein, and means for lifting said shafts and cup when the latter has drained to a predetermined extent.

CALHOUN COLLINS.